United States Patent
Sun et al.

(10) Patent No.: US 11,229,013 B2
(45) Date of Patent: Jan. 18, 2022

(54) CONTROL RESOURCE SET DESIGN FOR NEW RADIO-UNLICENSED OPERATIONS WITH SUBBAND ACCESS

(71) Applicant: QUALCOMM Incorporated, San Diego, CA (US)

(72) Inventors: Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 16/515,765

(22) Filed: Jul. 18, 2019

(65) Prior Publication Data

US 2020/0059916 A1  Feb. 20, 2020

(30) Foreign Application Priority Data

Aug. 20, 2018 (IN) .............................. 201841031080

(51) Int. Cl.
*H04W 72/04* (2009.01)
*H04W 16/14* (2009.01)
*H04W 74/08* (2009.01)

(52) U.S. Cl.
CPC ....... *H04W 72/0406* (2013.01); *H04W 16/14* (2013.01); *H04W 72/042* (2013.01); *H04W 72/0453* (2013.01); *H04W 74/0808* (2013.01)

(58) Field of Classification Search
CPC ............. H04W 72/0406; H04W 16/14; H04W 74/0808; H04W 72/042; H04L 5/0096;
(Continued)

(56) References Cited

U.S. PATENT DOCUMENTS

2019/0082427 A1* 3/2019 Kim ..................... H04L 5/0051
2020/0177306 A1* 6/2020 Choi .................... H04L 1/0072
(Continued)

FOREIGN PATENT DOCUMENTS

EP          3768013 A1 *  1/2021  ............ H04W 16/14

OTHER PUBLICATIONS

International Search Report and Written Opinio—PCT/US2019/042602—ISA/EPO—dated Oct. 11, 2019.

*Primary Examiner* — Vinncelas Louis
(74) *Attorney, Agent, or Firm* — Liem T. Do

(57) ABSTRACT

Design of control resource sets (CORESETs) is disclosed for new radio (NR) unlicensed (NR-U) operations with subband access. A default CORESET may be defined for multiple or all subbands within the allocated NR system bandwidth where each subband is covered by a sub-CORESET. When a decoding candidate of the set of decoding candidates spans the boundary of multiple sub-CORESETs, a base station may either remove the overlapping decoding candidate from the set of decoding candidates, shift the decoding candidate into the next location fully within a sub-CORESET, or continue transmission of the decoding candidate while puncturing the portion on the inaccessible subband. In the puncturing option, a user equipment (UE) would perform additional blind decoding in each subband according to the associated sub-CORESET. In additional aspects, after beginning of a transmission opportunity, the UE uses the knowledge of accessible subbands for fast CORESET switching via broadcast or UE-specific signaling.

16 Claims, 11 Drawing Sheets

(58) Field of Classification Search
CPC ... H04L 5/0053; H04L 5/0007; H04L 5/0042; H04L 5/0051; H04L 1/0072; H04L 1/0038
See application file for complete search history.

(56) References Cited

U.S. PATENT DOCUMENTS

| | | | |
|---|---|---|---|
| 2021/0067268 A1* | 3/2021 | Seo ........................ | H04L 1/0038 |
| 2021/0092772 A1* | 3/2021 | Nakashima ............ | H04W 16/14 |
| 2021/0119747 A1* | 4/2021 | Seo ..................... | H04W 72/042 |

* cited by examiner

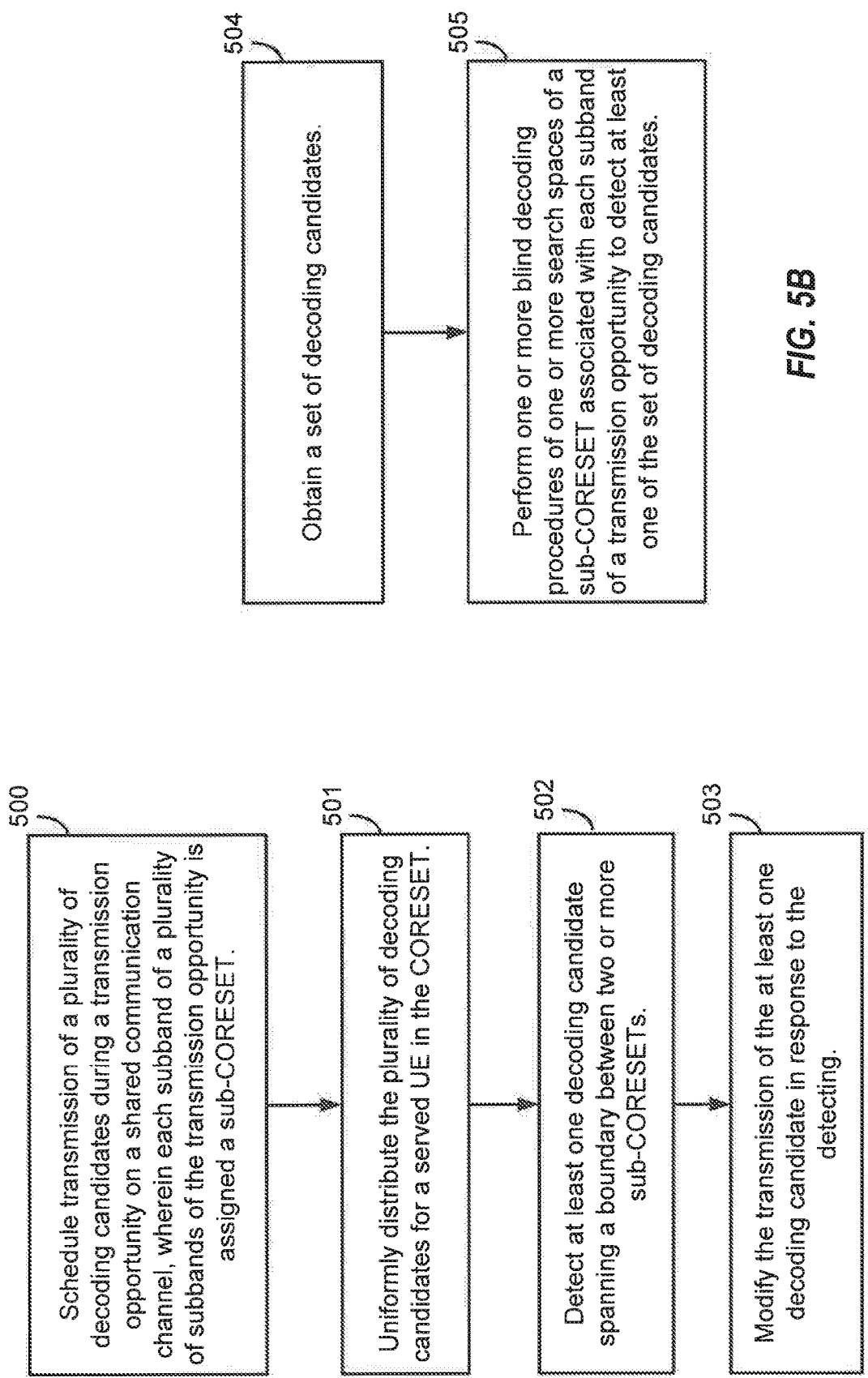

CONTROL RESOURCE SET DESIGN FOR NEW RADIO-UNLICENSED OPERATIONS WITH SUBBAND ACCESS

CROSS-REFERENCE TO RELATED APPLICATIONS

This application claims the benefit of Indian Application No. 201841031080, entitled, "CORESET DESIGN FOR NR-U WITH SUBBAND ACCESS," filed on Aug. 20, 2018, which is expressly incorporated by reference herein in its entirety.

BACKGROUND

Field

Aspects of the present disclosure relate generally to wireless communication systems, and more particularly, to control resource set (CORESET) design for new radio (NR) unlicensed (NR-U) operations with subband access.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RE transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes scheduling, by a base station, transmission of a plurality of decoding candidates during a transmission opportunity on a shared communication channel, wherein each subband of a plurality of subbands of the transmission opportunity is assigned a sub-control resource set (CORESET) of a CORESET allocated to the transmission opportunity, uniformly distributing, by the base station, the plurality of decoding candidates for a served user equipment (UE) into the CORESET, detecting, by the base station, at least one decoding candidate of the plurality of decoding candidates spanning a boundary between two or more sub-CORESETs, and modifying, by the base station, transmission of the at least one decoding candidate in response to the detecting.

In an additional aspect of the disclosure, a method of wireless communication includes obtaining, by a UE, a set of decoding candidates, and performing, by the UE, one or more blind decoding procedures of one or more search spaces of a sub-CORESET associated with each subband of a plurality of subbands of a transmission opportunity on a shared communication channel, wherein the one or more blind decoding procedures are performed to detect at least one of the set of decoding candidates.

In an additional aspect of the disclosure, an apparatus configured for wireless communication includes means for scheduling, by a base station, transmission of a plurality of decoding candidates during a transmission opportunity on a shared communication channel, wherein each subband of a plurality of subbands of the transmission opportunity is assigned a sub-CORESET of a CORESET allocated to the transmission opportunity, means for uniformly distributing, by the base station, the plurality of decoding candidates for a served UE into the CORESET, means for detecting, by the base station, at least one decoding candidate of the plurality of decoding candidates spanning a boundary between two or more sub-CORESETs, and means for modifying, by the base station, transmission of the at least one decoding candidate in response to the means for detecting.

In an additional aspect of the disclosure, an apparatus configured for wireless communication includes means for obtaining, by a UE, a set of decoding candidates, and means for performing, by the UE, one or more blind decoding procedures of one or more search spaces of a sub-CORESET associated with each subband of a plurality of subbands of a transmission opportunity on a shared communication channel, wherein the one or more blind decoding procedures are performed to detect at least one of the set of decoding candidates.

In an additional aspect of the disclosure, a non-transitory computer-readable medium having program code recorded thereon. The program code further includes code to schedule, by a base station, transmission of a plurality of decoding candidates during a transmission opportunity on a shared communication channel, wherein each subband of a plurality of subbands of the transmission opportunity is assigned a sub-CORESET of a CORESET allocated to the transmission opportunity, code to uniformly distribute, by the base station, the plurality of decoding candidates for a served UE into the CORESET, code to detect, by the base station, at least one decoding candidate of the plurality of decoding candidates spanning a boundary between two or more sub-CORESETs, and code to modify, by the base station, transmission of the at least one decoding candidate, in response to the code to detect.

In an additional aspect of the disclosure, a non-transitory computer-readable medium having program code recorded thereon. The program code further includes code to obtain, by a UE, a set of decoding candidates, and code to perform, by the UE, one or more blind decoding procedures of one or more search spaces of a sub-CORESET associated with each subband of a plurality of subbands of a transmission opportunity on a shared communication channel, wherein the one or more blind decoding procedures are performed to detect at least one of the set of decoding candidates.

In an additional aspect of the disclosure, an apparatus configured for wireless communication is disclosed. The apparatus includes at least one processor, and a memory coupled to the processor. The processor is configured to schedule, by a base station, transmission of a plurality of decoding candidates during a transmission opportunity on a shared communication channel, wherein each subband of a plurality of subbands of the transmission opportunity is assigned a sub-CORESET of a CORESET allocated to the transmission opportunity, to uniformly distribute, by the base station, the plurality of decoding candidates for a served UE into the CORESET, to detect, by the base station, at least one decoding candidate of the plurality of decoding candidates spanning a boundary between two or more sub-CORESETs, and to modify, by the base station, transmission of the at least one decoding candidate in response to the configuration of the at least one processor to detect.

In an additional aspect of the disclosure, an apparatus configured for wireless communication is disclosed. The apparatus includes at least one processor, and a memory coupled to the processor. The processor is configured to obtain, by a UE, a set of decoding candidates, and to perform, by the UE, one or more blind decoding procedures of one or more search spaces of a sub-CORESET associated with each subband of a plurality of subbands of a transmission opportunity on a shared communication channel, wherein the one or more blind decoding procedures are performed to detect at least one of the set of decoding candidates.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A and 5B are block diagrams illustrating example blocks executed to implement aspects of the present disclosure.

DETAILED DESCRIPTION

Figure 1:
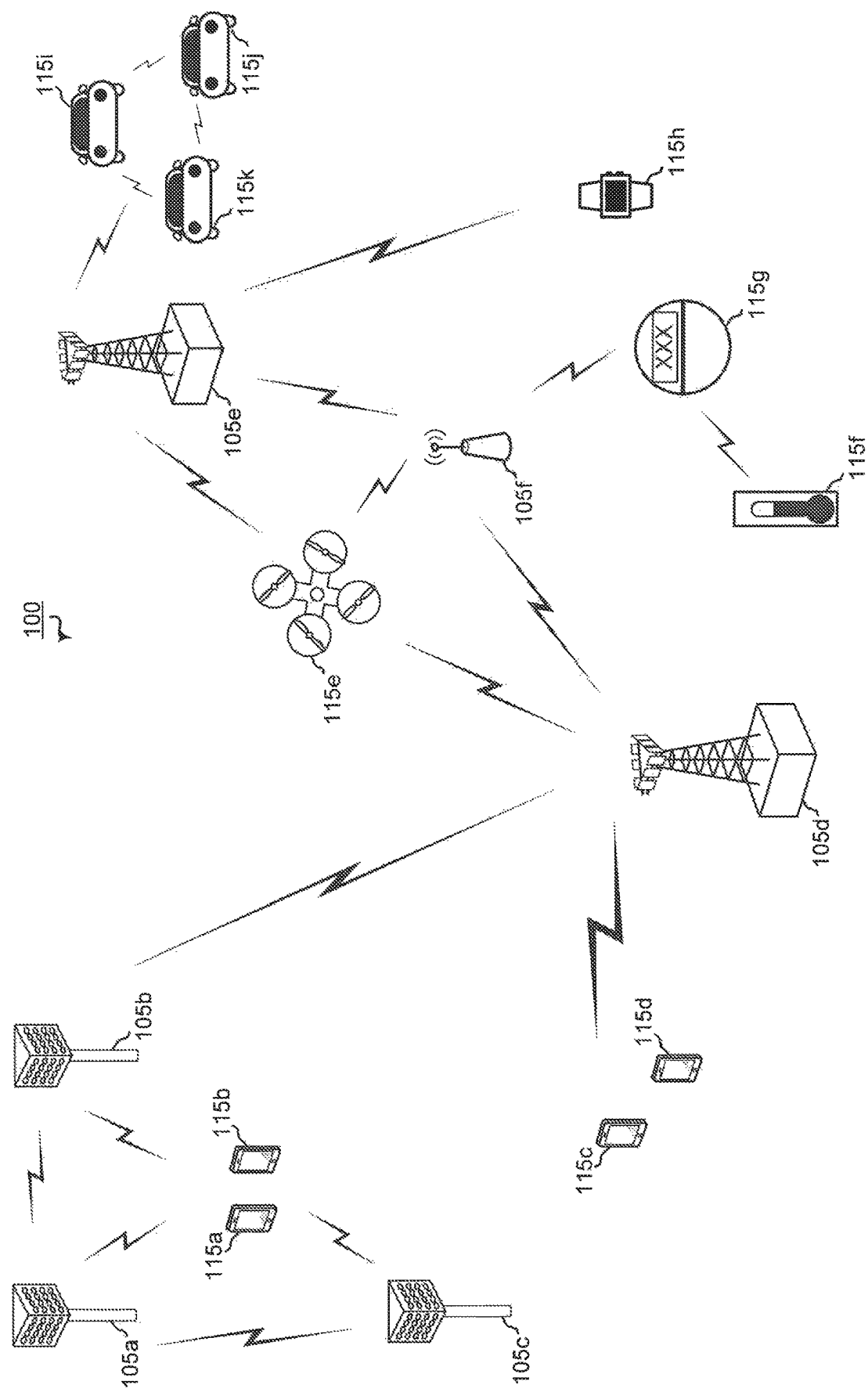
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro-base station 105e.

5B network 100 may further support operations in NR-unlicensed (NR-U) spectrum, in which access to a shared communication channel is obtained after successfully performing a listen before talk. A base station, such as base station 105a, may schedule transmission of a plurality of decoding candidates for UEs, such as UE 115a and 115b, during a transmission opportunity on a shared communication channel, wherein each subband of a plurality of subbands of the transmission opportunity is assigned a sub-control resource set (CORESET) of a CORESET allocated to the transmission opportunity. Base station 105a may uniformly distribute the plurality of decoding candidates for a served UE into the CORESET. Base station 105a may detect at least one decoding candidate of the plurality of decoding candidates spanning a boundary between two or more sub-CORESETs and modify transmission of the at least one decoding candidate in response to detecting the overlapping portion.

Figure 2:
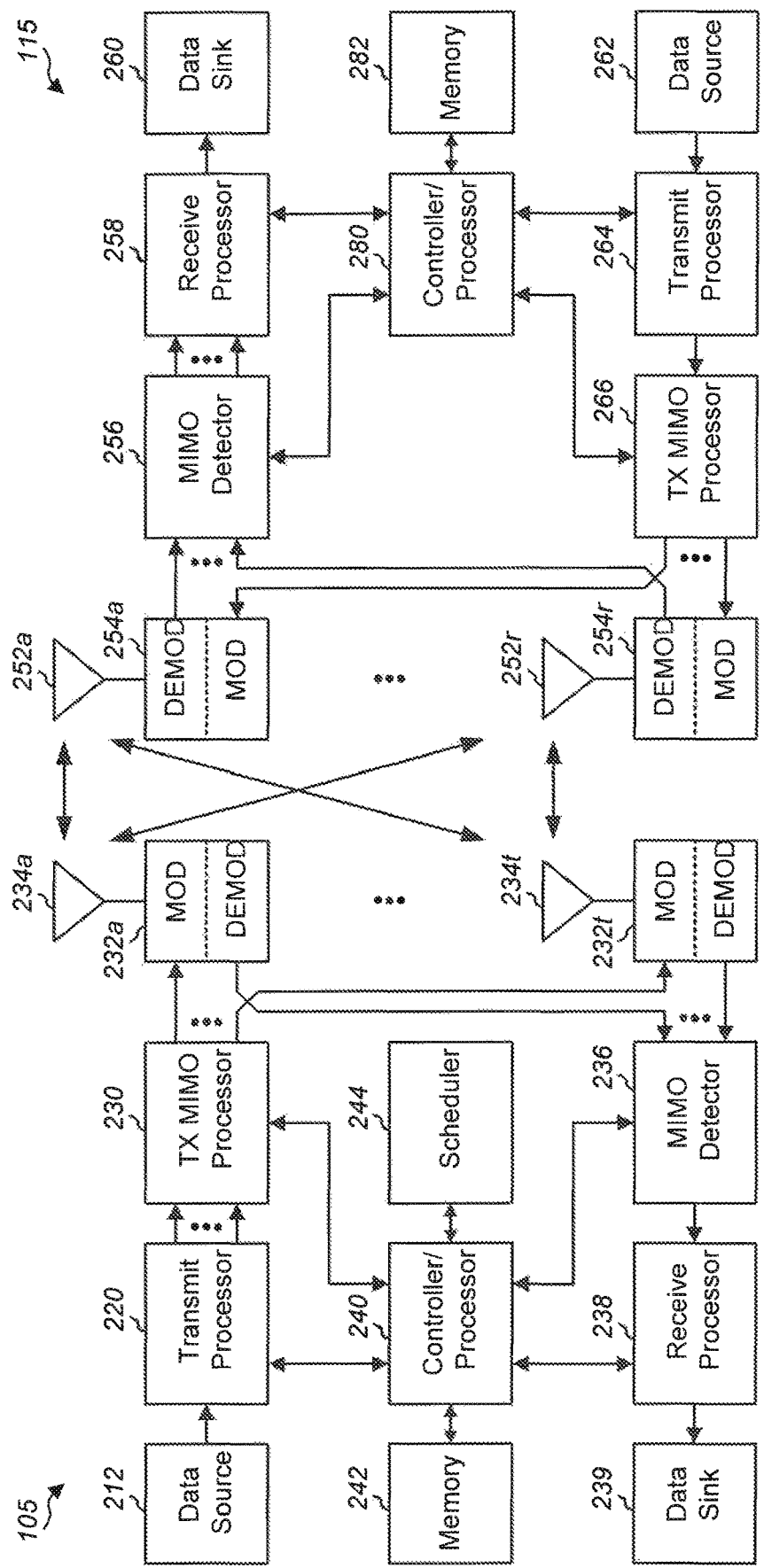
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A, 5B, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
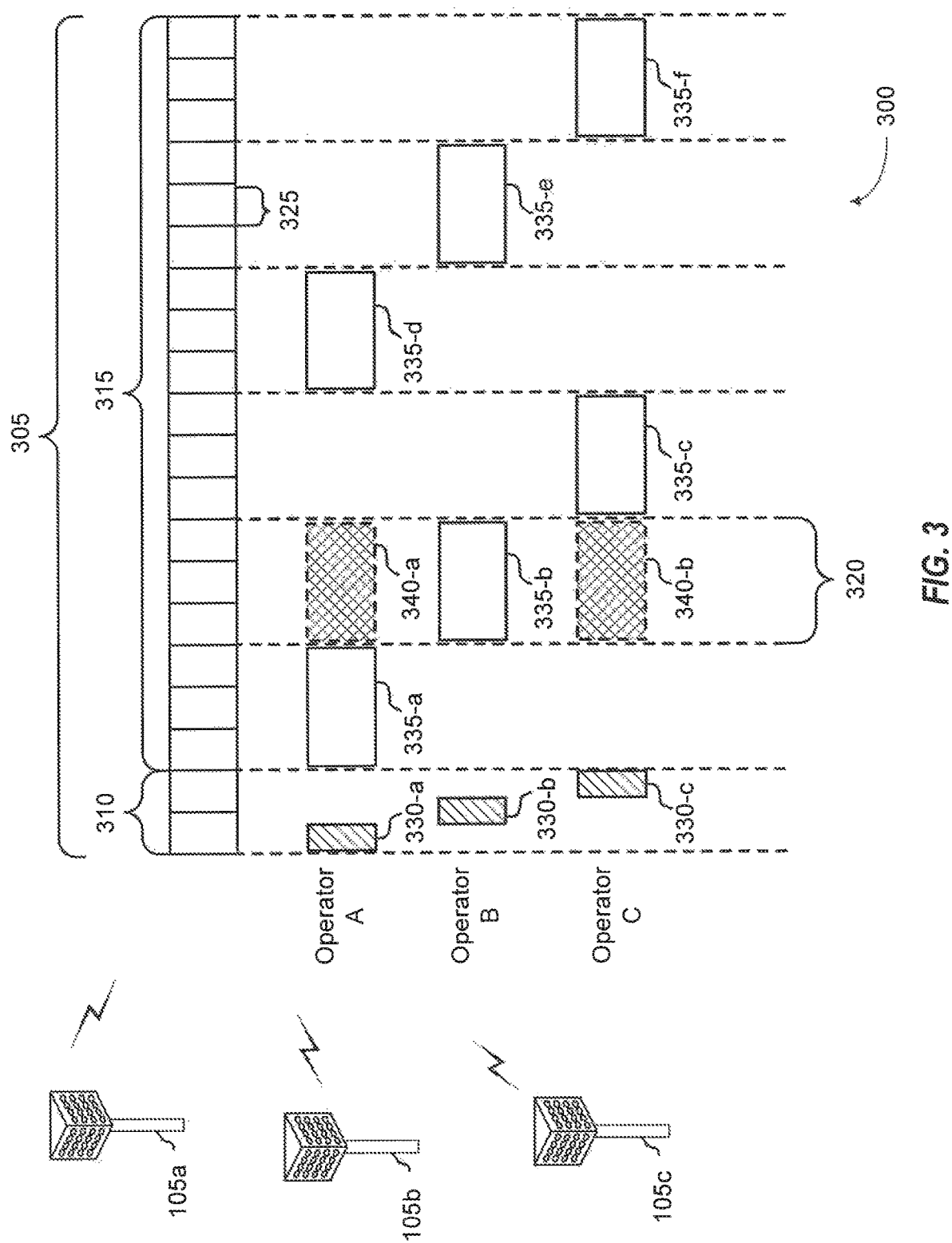
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in NG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular (i-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than. Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its (i-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or G-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may' alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

5G NR operations, including NR unlicensed (NR-U) installations, may be configured with wideband system bandwidths, for example in multiples of 20 MHz (e.g., 20 MHz, 40 MHz, 60 MHz, 100 MHz, etc.). However, 5G NR operations may also compete for access to shared channels with other radio access technologies, such as WiFi, which operates in a 20 MHz channel access manner. Thus, a typical NR operating mode may use a subband access procedure to establish communication with the shared communication channel, which may include the entire system bandwidth or a portion of the allocated bandwidth (e.g., a bandwidth part (BWP)).

In operation, the active BWP is divided into multiple subbands. In NR-U operations, because WiFi may compete for channel access on a 20 MHz level, an NR-U network entity (e.g., gNB, base station, UE, etc.) would perform a listen before talk (LBT) operation on each subband to determine whether it may access and use the subband for communications. Thus, an NR-U network entity dynamically determines which of the allocated subbands are accessible and which are not. The accessible subbands, in which a successful LBT is performed, may or may not be continuous, but the UE does not know in advance exactly which subband(s) may be used. It may be beneficial to thoughtfully consider design of the control resource sets (CORESETs) for the candidate subbands when accessibility is unknown in advance. Because a UE does not know in advance which subbands will pass LBT, CORESET design should be capable to handle any combination of eventual subband usage.

Figure 4A:
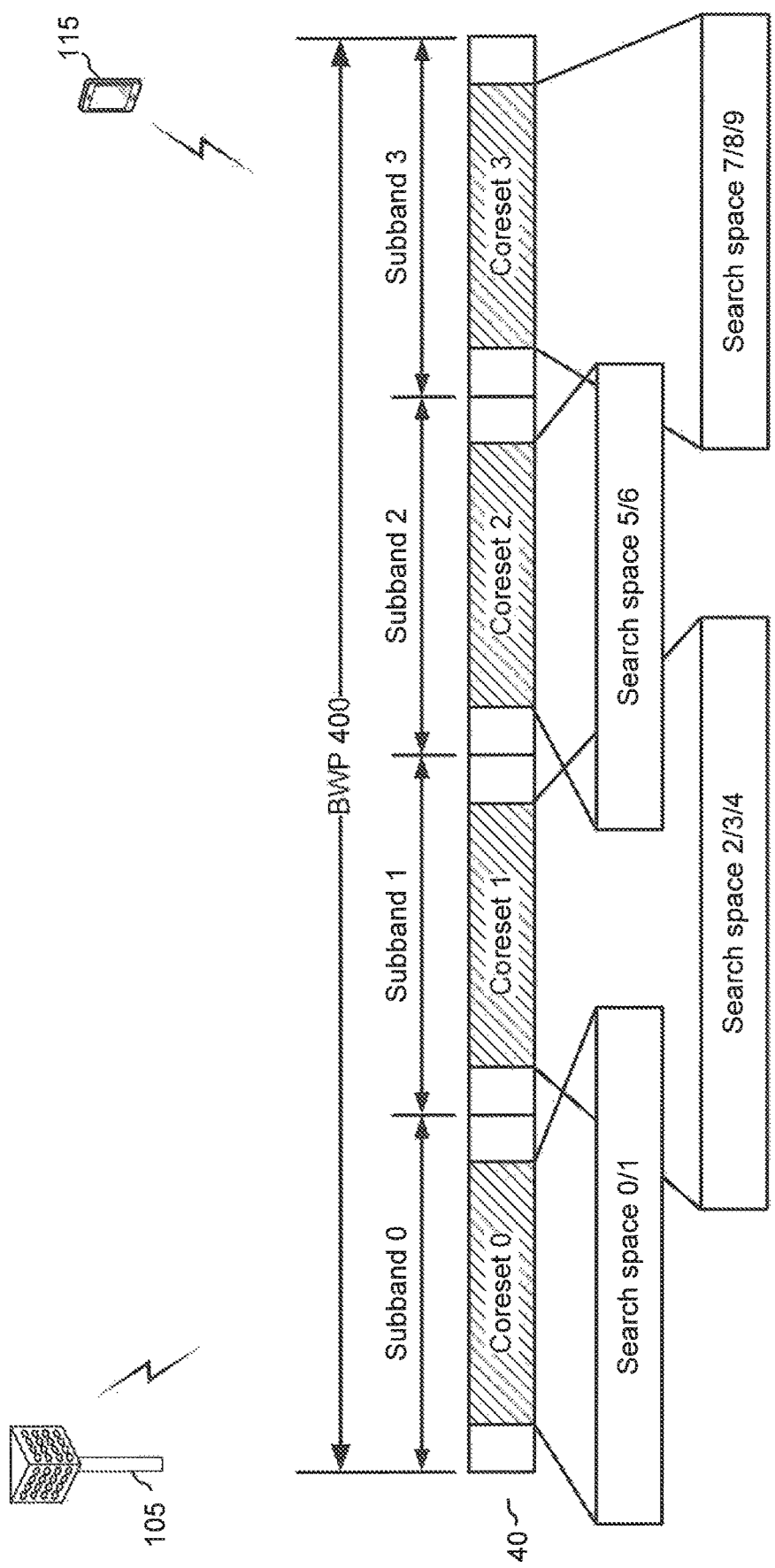
FIGS. 4A and 4B are block diagrams illustrating a base station and UE in communications over NR-U operations implementing a prior CORESET design solution.

FIG. 4A is a block diagram illustrating a base station 105 and UE 115 in communications 40 over NR-U operations implementing a prior CORESET design solution. FIG. 4A illustrates a previously proposed solution in which BWP 400 may be accessed via four subbands, subbands 0-3. Multiple CORESETs, CORESETs 0-3, are configured and allocated to each of subband 0-3, with further configuration of the search space sets, search spaces 0-9, in each CORESET.

Difficulties with this multi-CORESET solution may arise due to the limited number of CORESETs and search space sets currently supported in NR configurations. Currently, NR supports a maximum of three CORESETs with 10 search space sets per BWP, with four BWPs per cell. For a BWP of 80 MHz and LBT subband of 20 MHz, there are four available subbands per BWP, there would be four associated CORESETs for each BWP (one for each subband of the BWP), which already exceeds the supported maximum number of CORESETs.

Figure 4B:
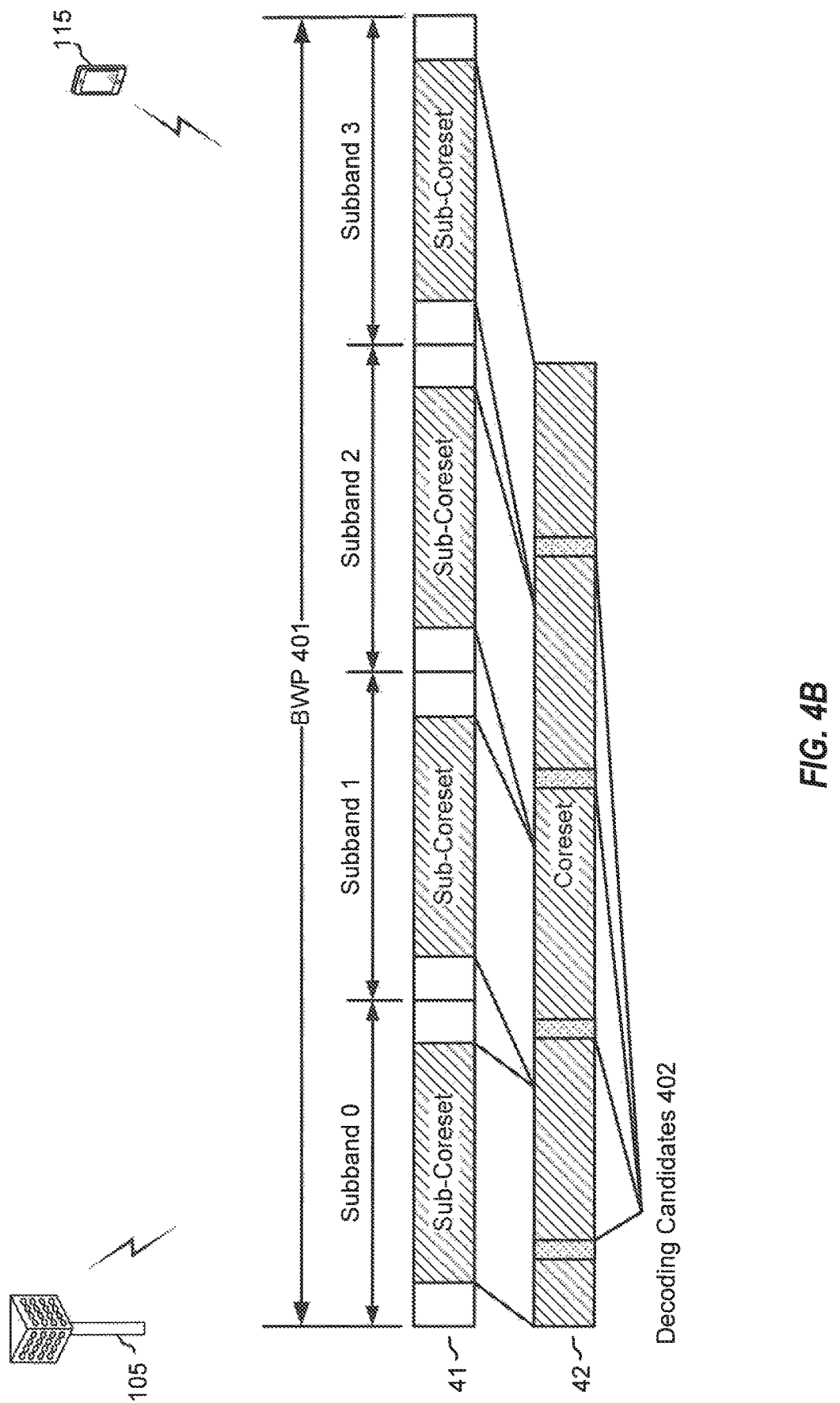

FIG. 4B is a block diagram illustrating a base station 105 and UE 115 in communications 41 over NR-U operations implementing another previously suggested CORESET design solution.

According to the previously proposed solution illustrated in FIG. 4B, a single, wideband CORESET 42 is configured to be hashed or distributed in portions over each subband, subbands 0-3, of BWP 401. The portions of wideband CORESET 42 associated with each subband may be referred to as a sub-CORESETs, sub-CORESET 41. Base station 105 may then distribute transmission of a decoding candidate 402 (e.g., downlink control channel, PDCCH, etc.) across each of subband 0-3 within the search space set of the associated sub-CORESET 41. As base station 105 performs LBT procedures for each of subband 0-3, for any transmissions, including transmissions of the decoding candidate part 402, falling within a subband in which the LBT fails, base station 105 would puncture the corresponding resource element groups (REGs) of sub-CORESET 41 that fall within the inaccessible subbands. The CORESET design solution illustrated in FIG. 4B would include interleaved component carrier element (CCE)-to-REG mapping and use a large enough aggregation level to have enough CCEs to be distributed to all of subbands 0-3 (before puncturing).

It should be noted that all of subbands 0-3 in BWP 401 would not necessarily have a corresponding CORESET 42/sub-CORESET 41 configured. There would be a service or throughput trade-off, such that, when fewer subbands are configured with sub-CORESET 41, UE 115 could not be served when those subbands pass LBT.

Difficulties with the features illustrated in FIG. 4B may arise with the decoding performance for set of decoding candidates 402 (e.g., PDCCH). For wideband CORESET 42 configured for distribution across all of subbands 0-3 and having any REGs falling within inaccessible subbands punctured, the decoding performance by UE 115 of set of decoding candidates 402 may fall because the punctured parts would be unknown.

It should further be noted that, in order to ensure sufficient REGs for even distribution in all of the distributed sub-CORESETs, the aggregation level may be higher. Therefore, decoding performance with a large aggregation level but heavy puncturing may not be optimized for Polar code design.

Aspects of the present disclosure include design of a single CORESET that may be distributed over multiple/all subbands of a given BWP, with one sub-CORESET assigned per subband. Each sub-CORESET may be a multiple of 6RBs wide with localized CCE-to-REG mapping and uniform hashing or distribution of a set of decoding candidates in the CCE space. If the sub-CORESET size is selected properly, with low enough aggregation level, the decoding candidates should not span sub-CORESET/subband boundaries. However, this is not guaranteed, and, especially with higher symbol-size CORESETs, one or more of the distributed decoding candidates may span the boundary between multiple sub-CORESETs. The various aspects of the present disclosure are directed to modifying transmission of the set of decoding candidates when one or more of the candidates overlaps the boundary of multiple sub-CORESETs. For such decoding candidates that span the boundary of multiple sub-CORESETs, a base station may either remove the decoding candidate from the set of candidates, thus, treating it as invalid and not using it; dither the decoding candidate to shift it to the next location fully contained within a sub-CORESET; or continue transmission of the decoding candidate but with puncturing of the portion located in the inaccessible subband, which may cause the receiver processing to become more complex.

It should be noted that, in all such optional cases, the UE should know about the existence of the subbands or sub-CORESETs.

Figure 9:
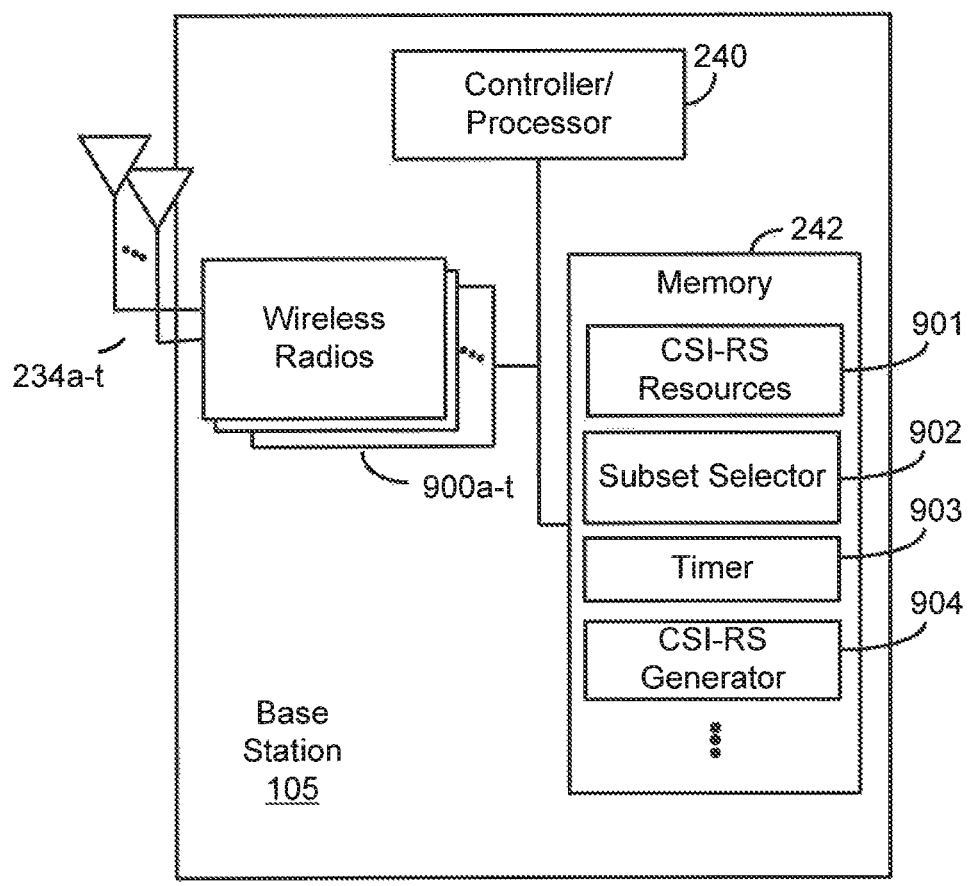
FIG. 9 is a block diagram illustrating an example base station configured according to one aspect of the present disclosure.

FIG. 5A is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900$a$-$t$ and antennas 234$a$-$t$. Wireless radios 900$a$-$t$ includes various components and hardware, as illustrated in FIG. 2 for base station 105, including modulator/demodulators 232$a$-$t$, MIMO detector 236, receive processor 238, transmit processor 220, and TX MIMO processor 230.

At block 500, a base station schedules transmission of a plurality of decoding candidates during a transmission opportunity on a shared communication channel, wherein each subband of a plurality of subbands of the transmission opportunity is assigned a sub-CORESET of a wideband CORESET allocated to the BWP of the transmission opportunity. For example, base station 105, under control of controller/processor 240, executes decoding candidate scheduler 901, stored in memory 242. The execution of decoding candidate scheduler 901 provides for base station 105 to configure a set of decoding candidates for distribution across search spaces of the CORESET.

At block 501, the base station uniformly distributes the plurality of decoding candidates for a served UE into the CORESET. Within the execution environment of decoding candidate scheduler 901 further provides for uniform distribution of the plurality of decoding candidates in the CORESET.

At block 502, the base station detects at least one decoding candidate of the plurality of decoding candidates spanning a boundary between two or more sub-CORESETs. Base station 105, under control of controller/processor 240 determines the location of each of the distributed decoding candidates relative to the layout of the subbands and assigned sub-CORESETs and may identify when a decoding candidate overlaps two subbands and two sub-CORESETs.

At block 503, the base station modifies the transmission of the at least one decoding candidate portion in response to the detecting. For example, base station 105, under control of controller/processor 240 executes overlap logic 903, stored in memory 242. The execution environment of overlap logic 903 provides for addressing the overlapping decoding candidates. In a first optional solution, base station 105 may simply remove the decoding candidate that spans the boundary between sub-CORESETs from the plurality of decoding candidates. A second optional solution may provide for base station 105 to shift the transmission location of the overlapping decoding candidate to a next available location wholly within a sub-CORESET. A third optional solution provides for base station 105 to continue the scheduled transmission of the overlapping decoding candidate, but, where one of the subbands associated with the sub-CORESETs across which boundary the decoding candidate spans fails LBT and is inaccessible, transmission of that part of the decoding candidate is punctured.

Figure 10:
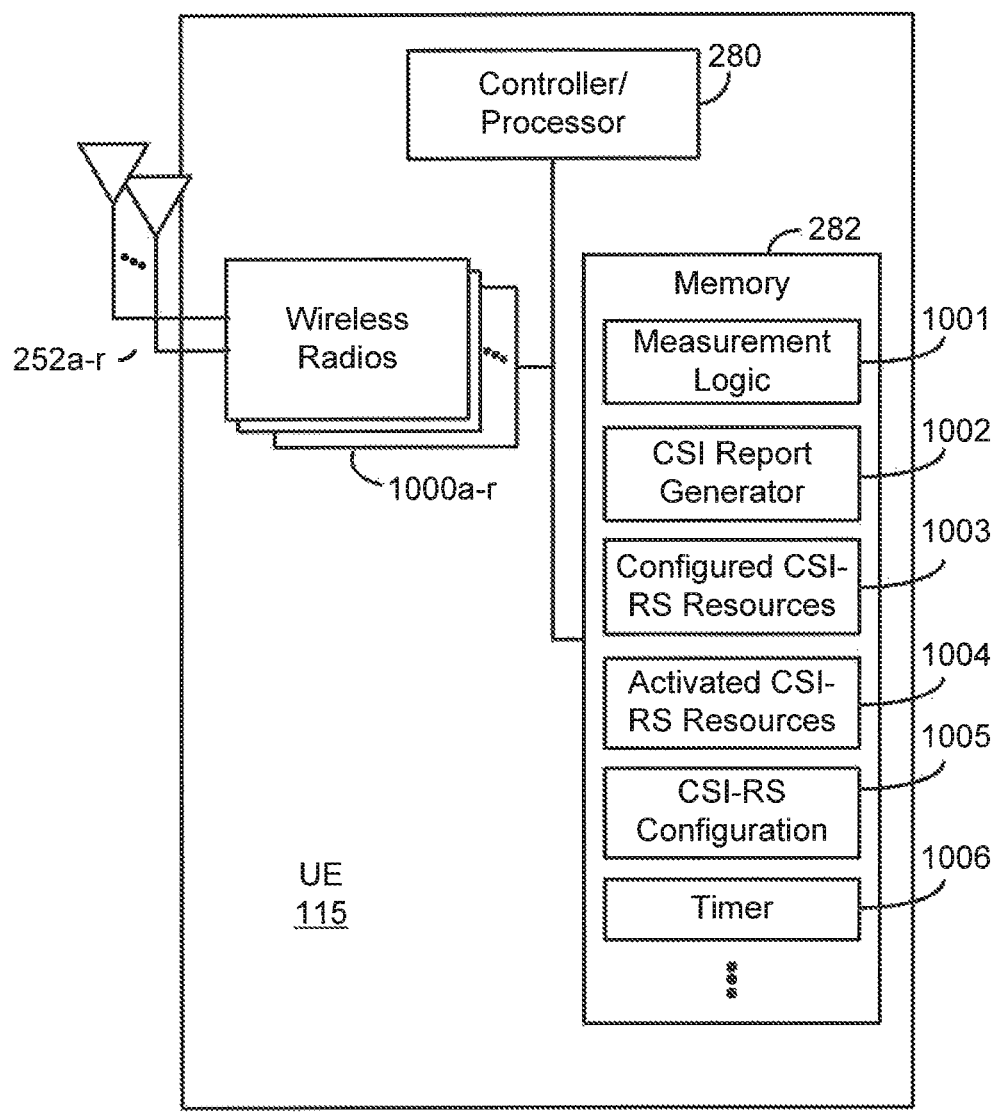
FIG. 10 is a block diagram illustrating an example UE configured according to one aspect of the present disclosure.

FIG. 5B is a block diagram illustrating example blocks executed to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115.

UE 115, under control of controller/processor 280, transmits and receives signals via wireless radios 1000*a-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 504, a UE obtains a set of decoding candidates. For example, UE 115 obtains the set of decoding candidates including potential locations within the search spaces of the sub-CORESETs in each subband. UE 115 may obtain this information from system broadcast, from semi-static signaling, dynamic signaling, or the like, and stored at decoding candidate set 1001, in memory 282. It may also obtain the information from device information pre-programmed into decoding candidate set 1001 by a device manufacturer.

At block 504, the UE performs one or more blind decoding procedures of one or more search spaces of a sub-CORESET associated with each subband of a plurality of subbands of a transmission opportunity on a shared communication channel, wherein the one or more blind decoding procedures are performed to detect at least one of the set of decoding candidates. For example, UE 115, under control of controller/processor 280, executes blind decoding logic 1002. The execution environment of blind decoding logic 1002 allows for UE 115 to perform a certain number of blind decoding procedures to detect the set of decoding candidates among the search spaces.

The first optional solution is the simplest design. On the UE side, UE 115 may reuse the blind decoding process that would have been used on the dropped candidate for other search space sets. The second optional solution maintains the number of blind decodings without sacrificing scheduler flexibility, but additional rules would be introduced to perform the dithering or shifting. For example, if a decoding candidate portion is scheduled on the boundary, the base station may shift by 1 candidate location at the same aggregation level. The third optional solution may be simple for the transmitter, but more complex with the receiver processing. The receiver would attempt to identify the part of the decoding candidate portion not transmitted due to subband LBT failure, which could increase the number of blind decodings performed by UE 115. A receiver, such as UE 115, may be configured to use two or three hypotheses, as a part of the execution environment of blind decoding logic 1002, in attempting to detect and decode a decoding candidate portion transmitted according to the third optional solution. Using a two-hypothesis approach, UE 115 may use two blind decoding processes: one for the assumption that the part of the decoding candidate portion was transmitted over subband A/sub-CORESET A; and another for the assumption that the part of the decoding candidate portion was transmitted over subband B/sub-CORESET B. Using the three-hypothesis approach, in addition to the two blind decoding procedures used for the first two hypotheses above, another blind decoding procedure would be used for the assumption that both parts of the decoding candidate portion are successfully transmitted over subband A/sub-CORESET A and subband B/sub-CORESET B. A UE, such as UE 115, may also just try a single hypothesis approach by assuming both parts are transmitted but that may be associated with some performance loss as the punctured part would just add noise in the decoder.

Figure 6:
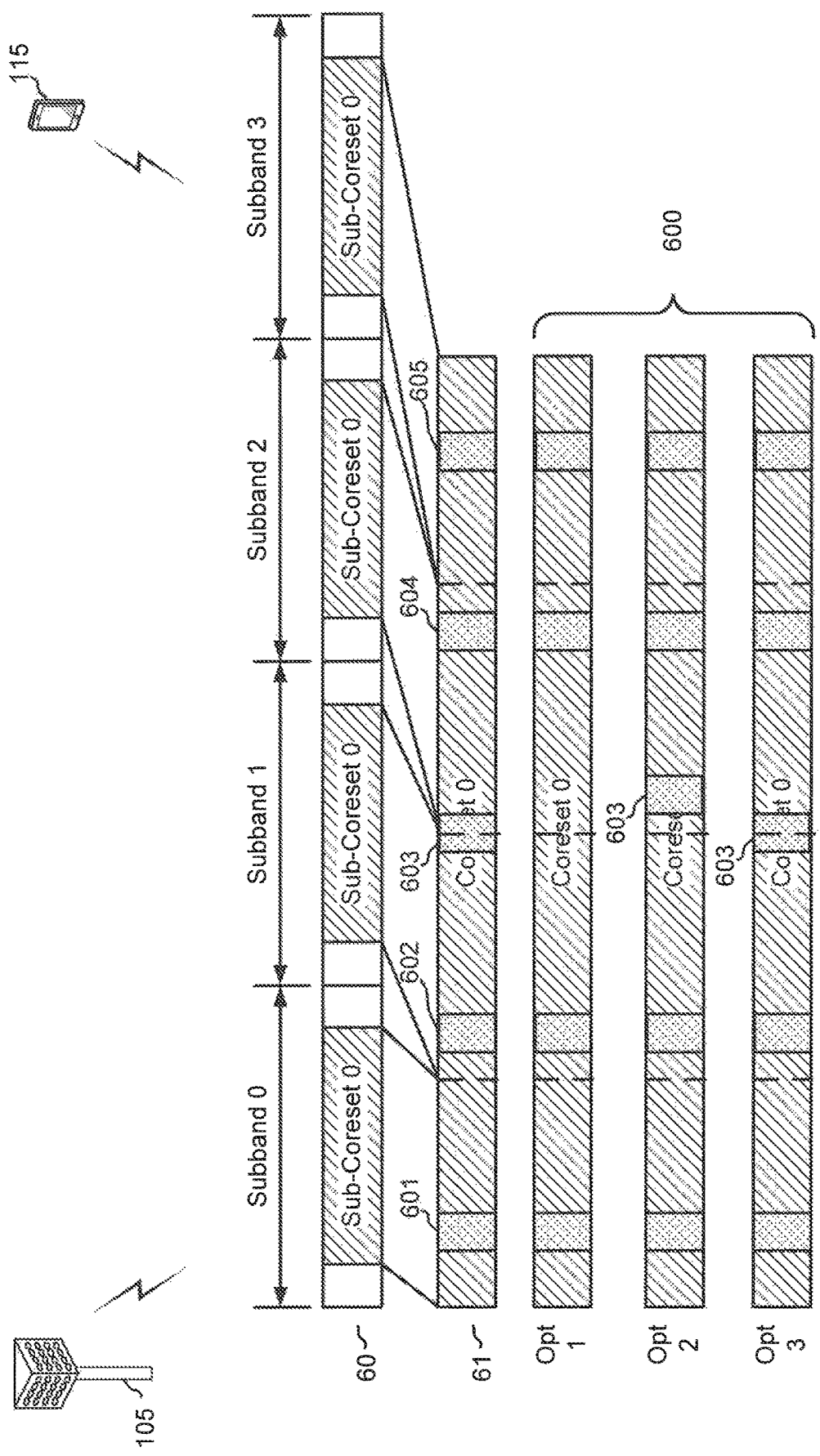
FIG. 6 is a block diagram illustrating a base station and UE configured according to one aspect of the present disclosure.

FIG. 6 is a block diagram illustrating a base station 105 and UE 115 configured according to one aspect of the present disclosure. Base station 105 and UE 115 engage in communications 60 over an NR-U network. The entire allocated BWP for communication 60 is divided into four subbands, subbands 0-3. A wideband CORESET 0 is defined for the BWP with individual sub-CORESET 0 allocated to each of subband 0-3. Transmission 61 illustrates the scheduled communications that base station 105 prepares for UE 115, which includes distribution or hashing of a plurality of decoding candidates 601-605. Each decoding candidate of transmission 61, including decoding candidates 601-605 are uniformly distributed onto subbands 0-3. Optional scheduled communications 600 provide implementation of one of the optional solutions for handling a decoding candidate overlapping a boundary of multiple sub-CORESETs, such as decoding candidate 603.

Upon detecting that decoding candidate 603 overlaps the boundary between subband 1 and subband 2, and, therefore, the boundary between sub-CORESET 0 assigned to subbands 1 and 2, base station 105 may modify the transmission of the decoding candidates 601-605 according to one of the optional solutions. According to the first optional solution, base station 105 removes decoding candidate 603 from the plurality of decoding candidates 601-605 for Opt 1 scheduled communication of optional scheduled communications 600.

Alternatively, according to the second optional solution, when base station 105 detects decoding candidate 603 overlaps the boundary between subbands 1 and 2, it shifts the scheduled transmission of decoding candidate 603 to a next available location wholly within subband 2, as illustrated in Opt 2 scheduled communication of optional scheduled communications 600.

Alternatively, according to the third optional solution, when base station 105 detects decoding candidate 603 overlaps the boundary between subbands 1 and 2, it continues with the scheduled transmission of decoding candidate 603, but will transmit according to the accessibility of subbands 1 and 2. In a first example occasion, the LBT fails for subband 1 and passes for subband 2. In such a scenario, the part of decoding candidate 603 that lies within subband 1 is punctured, while the part in subband 2 is transmitted. In a second example occasion, the LBT passes for subband 1, but fails for subband 2. Conversely, the part of decoding candidate 603 located in subband 1 is transmitted while the part in subband 2 is punctured. In a third example occasion, LBT for both subbands 1 and 2 pass, in which case the part of decoding candidate 603 in subband 1 is transmitted according to the assigned sub-CORESET 0 for subband 1 and the part of decoding candidate 603 in subband 2 is transmitted according to the assigned sub-CORESET 0 for subband 2.

In each such optional solution, the CORESET overhead is increased with higher decoding candidate monitoring complexity. Additional aspects of the present disclosure are directed to fast CORESET switching. Outside of the transmission opportunity (TXOP) or in the beginning slots in the TXOP, the default CORESET structure of sub-CORESETs assigned without LBT knowledge, as described above, may be used. For example, one such specific option may be used for the UE to monitor the start of TXOP (when common PDCCH is used to indicate the TXOP start). In addition, the specific optional solution described above may be used for scheduling in the first few slots in the TXOP. Inside the TXOP or at least within a few slots after the start of the TXOP, the UE may be configured with different CORESET configurations which can take the LBT outcome or channel accessibility into consideration. This allows potentially less overhead with the CORESET design and, thus, fewer decoding candidate monitoring occasions for the UE. In other words, given a fixed PDCCH processing capability (e.g., a fixed, maximum number of blind decoding processes that the UE can conduct), the UE can use those finite capabilities more efficiently and allocate the computational power to the accessible subbands.

Figure 7:
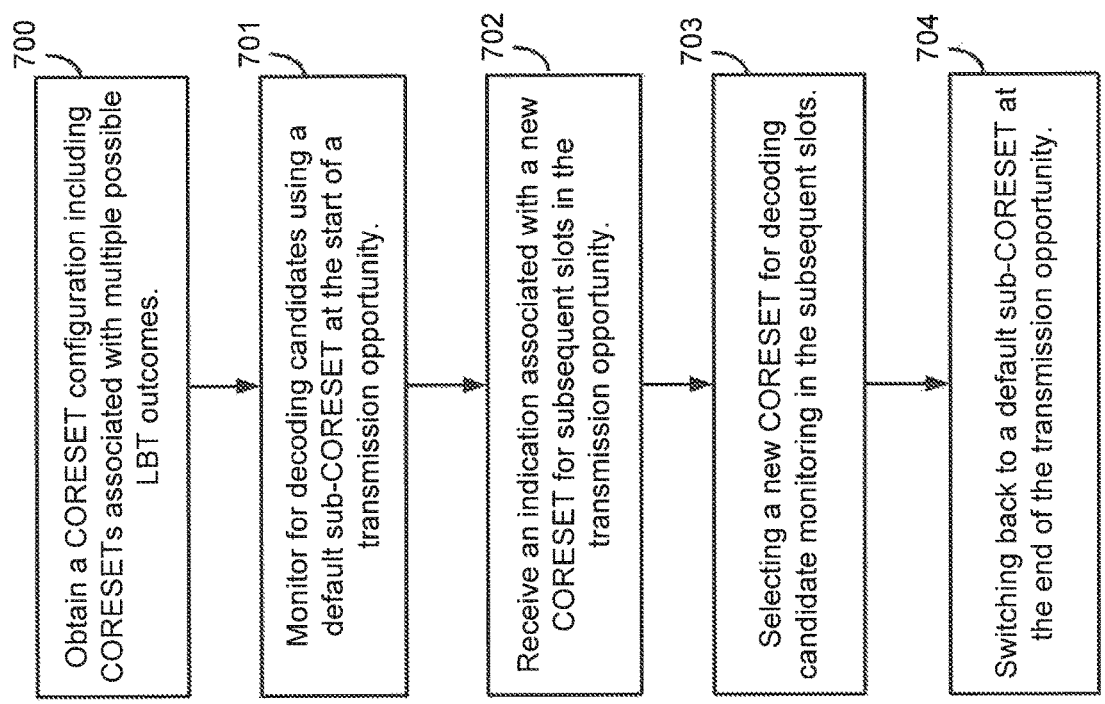
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to UE 115 as illustrated in FIG. 10.

At block 700, a UE obtains a CORESET configuration including CORESETs associated with multiple possible LBT outcomes. For example, UE 115 may receive a CORESET configuration signal from a serving base station via antennas 252a-r and wireless radios 1000a-r. The set of CORESETs within the CORESET configuration along with associated subband combinations are stored at CORESET configuration 1004, in memory 282.

At block 701, the UE monitors for a plurality of decoding candidates using a default sub-CORESET at the start of a transmission opportunity. For example, UE 115, under control of controller/processor 280, accesses the default CORESET information at default CORESET 1003, in memory 282. The default CORESET information identifies the sub-CORESETs assigned to each subband in the active BWP. Using this default CORESET information, UE 115 may monitor relevant search space for the plurality of decoding candidates.

At block 702, the UE receives an indication associated with a new CORESET for subsequent slots in the transmission opportunity. For example, UE 115 receives a message from a serving base station that indicates the accessible subbands of the allocated BWP. UE 115 may store such accessibility information at subband usage 1005, in memory 282.

At block 703, the UE selects a new CORESET for decoding candidate monitoring in the subsequent slots. In response to this combination of known accessible subbands, UE 115 may select a corresponding new CORESET in CORESET configuration 1004. UE 115 uses the new CORESET for performing blind decoding for decoding candidates according to the new CORESET.

At block 704, the UE switches back to a default sub-CORESET at the end of the transmission opportunity. As UE 115 detects the end of the transmission opportunity, it returns to operations using the default CORESET, stored at default CORESET 1003.

Figure 8:
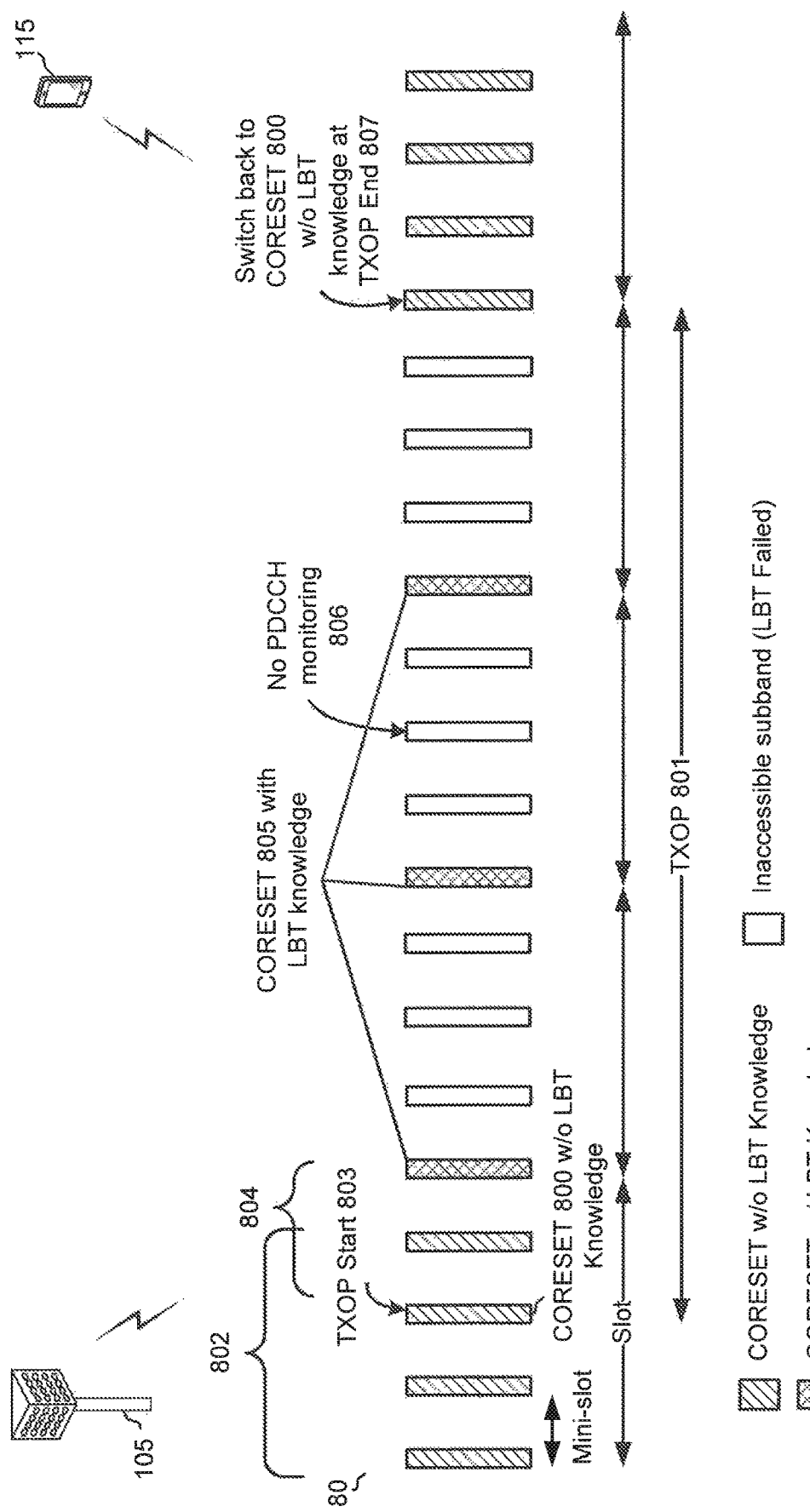
FIG. 8 is a block diagram illustrating a base station and UE configured according to one aspect of the present disclosure.

FIG. 8 is a block diagram illustrating a base station 105 and UE 115 configured according to one aspect of the present disclosure. Base station 105 and UE 115 are engaged in communication stream 80 over an NR-U network. The communication slots of communication stream 80 includes mini-slot communication capabilities within each slot. Prior to TXOP 801, base station 105 schedules transmissions using the default CORESET 800 that does not account for LBT knowledge. UE 115 monitors for decoding candidate transmissions in each mini-slot according to the default sub-CORESET assigned to the mini-slot from default CORESET 800. At some point within region 802, UE 115 receives a CORESET configuration message from base station 105. The CORESET configuration message includes a number of different CORESET configurations associated with various possible LBT outcomes. Thus, the CORESET configuration message includes different possible combinations of CORESETs with different combinations of accessible subbands.

UE 115 may thus be configured with multiple CORESET configurations, each corresponding to one or more potential LBT outcomes. For example, besides default CORESET 800 for outside or the beginning of TXOP 801, UE 115 may be configured with other CORESETs, each one corresponding to one or more possible LBT outcomes. The extreme case may be one CORESET configuration for each LBT outcome. For example, for four subbands with arbitrary LBT possibility and all subband combinations allowed for transmission base station 105 may configure up to 15 CORESET configurations within the CORESET configuration message. For four subbands case where transmission is allowed only for continuous subbands that pass LBT, the base station 105 may configure up to 10 CORESET configurations corresponding to the following allowed subband combinations $\{\{0\}, \{1\}, \{2\}, \{3\}, \{0,1\}, \{1,2\}, \{2,3\}, \{0,1,2\}, \{1,2,3\}, \{0,1,2,3\}\}$ selected by gNB for transmission. A more general case may include configuration of one CORESET for a set of LBT outcomes (e.g., Subband 0/1/2/3 LBP pass and subband 0/1 LBT pass can share the same CORESET configuration with CORESET in subband 0/1). Each CORESET may span the subbands or set of subbands that have passed their LBT.

It should be noted that, while illustrated as being obtained by UE 115 at region 802, the various aspects of the present disclosure are not limited only to receiving such CORESET configuration message in the illustrated location. In fact, UE 115 may receive such configuration message semi-statically in RRC signaling or in system information broadcasts from base station 105 at any time during communication stream 80 prior to the trigger to switch CORESETs based on knowledge of LBT outcomes.

At 803, TXOP 801 starts. During the first few mini-slots of TXOP 801, UE 115 may continue to perform monitoring for decoding candidates according to the default sub-CORESET without knowledge of any LBT outcomes or in which the CORESET selection is not influenced by LBT outcomes. At region 804, UE 115 may receive an indication associated with a new CORESET for UE 115 to use in subsequent slots of TXOP 801. Such an indication may be received from base station 105 via a cell-specific signal or a UE-specific signal.

In a first optional aspect, a cell-specific CORESET switch may be used. For example, information identifying the start (803) of TXOP 801 may also include an indication of which subbands have passed their LBT. Such an indication may comprise a common control signals, such as common PDCCH (CPDCCH), system broadcast information (MIB or SIB), or specific RRC signaling. Once UE 115 detects this indication signal, UE 115 may select and switch to a different CORESET configuration, identified in the CORESET configuration message according to the LBT outcome information included in the indication. The indication signal may also include timing information that informs UE 115 when, after receipt of the indication at 804, UE 115 should switch to the new CORESET. The timing information ensures that both UE 115 and base station 105 are using the same CORESET at the same time.

It should be noted that, in additional or alternative aspects of the present disclosure, the indication signal may specifically identify the CORESET for UE 115 to switch to upon detecting which subbands have passed LBT.

In a second optional aspect, a UE-specific indication may be signaled, which provides a more dynamic signaling, such as via layer 1 (L1) signaling or downlink control information (DCI)-based signaling, identifying a CORESET switching signal. Within TXOP 801, base station 105 can send UE-specific L1 signaling to switch UE 115 from the default CORESET 800 configuration to the new CORESET 805 that includes LBT knowledge. As with the first optional aspect, timing information may be included in the CORESET switching signals or provided in separate L1 or RRC signaling. By switching to new CORESET 805 with LBT knowledge, UE 115 does not have to perform decoding candidate monitoring on subbands that did not pass LBT and on each mini-slot, such as mini-slot 806. Prior to the COT start, since gNB did not have access to the channel. it was desirable to allow gNB to start transmission at any mini-slot boundary so it does not have to wait for too long once it finds the channel is free. This however comes at cost of UE power since UE monitors for PDCH at every mini-slot. However, within the COT since gNB has the medium already, it can switch to a lower PDCCH monitoring period (monitor at slot level instead of mini-slot level) thereby saving UE power. The processing power of UE 115 may, therefore, be conserved for actual decoding candidate transmissions.

At the end of TXOP 801, UE 115 would automatically switch back to default CORESET 800 without LBT knowledge. With the beginning of a new TXOP, the LBT outcomes are again unknown for each subband allocated for communication stream 80 between base station 105 and UE 115. Accordingly, UE 115 would revert to monitoring based on the default sub-CORESET design applied for each slot or mini-slot of the next TXOP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   scheduling, by a base station, transmission of a plurality of decoding candidates during a transmission opportunity on a shared communication channel, wherein each subband of a plurality of subbands of the transmission opportunity is assigned a sub-control resource set (sub-CORESET) of a CORESET allocated to the transmission opportunity;
   uniformly distributing, by the base station, the plurality of decoding candidates for a served user equipment (UE) into the CORESET;
   detecting, by the base station, at least one decoding candidate of the plurality of decoding candidates spanning a boundary between two or more sub-CORESETs; and
   modifying, by the base station, transmission of the at least one decoding candidate in response to the detecting, wherein modifying the transmission of the plurality of decoding candidates includes:
      transmitting parts of the at least one decoding candidate in each subband associated with a first of the two or more sub-CORESETs that successfully obtains access to the shared communication channel; and
      puncturing other parts of the at least one decoding candidate in each other subband associated with a second of the two or more sub-CORESETs that fail to successfully obtain access to the shared communication channel.

2. The method of claim 1, wherein each subband of the plurality of subbands is associated with an independent listen before talk (LBT) procedure for one or both of the base station and the UE.

3. A method of wireless communication, comprising:
   scheduling, by a base station, transmission of a plurality of decoding candidates during a transmission opportunity on a shared communication channel, wherein each subband of a plurality of subbands of the transmission opportunity is assigned a sub-control resource set (sub-CORESET) of a CORESET allocated to the transmission opportunity;
   uniformly distributing, by the base station, the plurality of decoding candidates for a served user equipment (UE) into the CORESET;
   signaling, by the base station, a CORESET configuration to a served user equipment (UE), wherein the CORESET configuration includes a plurality of CORESETs, each of the plurality of CORESETs corresponding to one or more listen before talk (LBT) outcomes associated with the plurality of subbands;
   signaling, by the base station, a switch timing for the served UE to switch to a second CORESET identified by selection of one of the plurality of CORESETS of the CORESET configuration based on a LBT report, wherein the switch timing is signaled through one of: the signaling of the CORESET configuration or a broadcasting of the LBT report;
   detecting, by the base station, at least one decoding candidate of the plurality of decoding candidates spanning a boundary between two or more sub-CORESETs; and
   modifying, by the base station, transmission of the at least one decoding candidate in response to the detecting.

4. The method of claim 3, further including:
   broadcasting, by the base station, the LBT report after completing the LBT procedure for the each subband of the plurality of subbands prior to transmission of the decoding candidate, wherein the LBT report includes a result of the LBT procedure for the each subband.

5. A method of wireless communication, comprising:
   obtaining, by a user equipment (UE), a set of decoding candidates;
   receiving, by the UE, a control resource set (CORESET) configuration from the serving base station, wherein the CORESET configuration includes a plurality of CORESETs, each of the plurality of CORESETs corresponding to one or more listen before talk (LBT) outcomes associated with the plurality of subbands;
   receiving, by the UE, a listen before talk (LBT) report broadcast by the serving base station, wherein the LBT report includes a result of an LBT procedure of the serving base station for the each subband;
   receiving, by the UE, a switch timing for the served UE to switch to a second CORESET identified by selection of one of the plurality of CORESETS of the CORESET configuration based on the LBT report, wherein the switch timing is signaled through one of: the CORESET configuration or the LBT report;
   performing, by a user equipment (UE), one or more blind decoding procedures of one or more search spaces of a sub-control resource set associated with each subband of a plurality of subbands of a transmission opportunity on a shared communication channel, wherein the one or more blind decoding procedures are performed to detect at least one of the set of decoding candidates.

6. The method of claim 5, wherein the set of decoding candidates is modified to remove at least one decoding candidate associated with a location spanning two or more sub-CORESETs.

7. The method of claim 5, wherein the performing the one or more blind decoding procedures includes shifting one of the one or more blind decoding procedures associated with a location of a decoding candidate of the set of decoding candidates spanning two or more sub-CORESETs to a next available location fully within one of the two or more sub-CORESETs.

8. The method of claim 5, wherein the performing the one or more blind decoding procedures includes performing a blind decoding procedure on each of the two or more sub-CORESETs.

9. The method of claim 8, further including:
   performing an additional blind decoding procedure that spans both of the two or more sub-CORESETs.

10. The method of claim 5, further including:
    switching, by the UE, after the transmission opportunity back to a CORESET allocated to the transmission opportunity including a plurality of sub-CORESETs associated with the each subband of the plurality of subbands of the transmission opportunity.

11. An apparatus configured for wireless communication, the apparatus comprising:
   at least one processor; and
   a memory coupled to the at least one processor,
   wherein the at least one processor is configured:
      to schedule, by a base station, transmission of a plurality of decoding candidates during a transmission opportunity on a shared communication channel, wherein each subband of a plurality of subbands of the transmission opportunity is assigned a sub-control resource set (CORESET) of a CORESET allocated to the transmission opportunity;
      to uniformly distribute, by the base station, the plurality of decoding candidates for a served user equipment (UE) into the CORESET;
      to detect, by the base station, at least one decoding candidate of the plurality of decoding candidates spanning a boundary between two or more sub-CORESETs; and
      to modify, by the base station, transmission of the at least one decoding candidate in response to the configuration of the at least one processor to detect, wherein the configuration of the at least one processor to modify the transmission of the plurality of decoding candidates includes configuration of the at least one processor:
         to transmit parts of the at least one decoding candidate in each subband associated with one or more of the two or more sub-CORESETs that successfully obtains access to the shared communication channel; and
         to puncture other parts of the at least one decoding candidate in each other subband associated with other of the two or more sub-CORESETs that fail to successfully obtain access to the shared communication channel.

12. The apparatus of claim 11, wherein each subband of the plurality of subbands is associated with an independent listen before talk (LBT) procedure for one or both of the base station and the UE.

13. An apparatus configured for wireless communication, the apparatus comprising:
   at least one processor; and
   a memory coupled to the at least one processor,
   wherein the at least one processor is configured:
      to schedule, by a base station, transmission of a plurality of decoding candidates during a transmission opportunity on a shared communication channel, wherein each subband of a plurality of subbands of the transmission opportunity is assigned a sub-control resource set (sub-CORESET) of a CORESET allocated to the transmission opportunity;
      to uniformly distribute, by the base station, the plurality of decoding candidates for a served user equipment (UE) into the CORESET;
      to signal, by the base station, a CORESET configuration to a served user equipment (UE), wherein the CORESET configuration includes a plurality of CORESETs, each of the plurality of CORESETs corresponding to one or more listen before talk (LBT) outcomes associated with the plurality of subbands;
      to detect, by the base station, at least one decoding candidate of the plurality of decoding candidates spanning a boundary between two or more sub-CORESETs;
      to modify, by the base station, transmission of the at least one decoding candidate in response to the detecting; and
      to transmit, by the base station, a CORESET switch signal to a served user equipment (UE) after completing an LBT procedure for the each subband of the plurality of subbands prior to transmission of the decoding candidate, wherein the CORESET switch signal identifies a second CORESET for the served UE to switch to.

14. The apparatus of claim 13, wherein the at least one processor is further configure to signal, by the base station, a switch timing for the served UE to switch to the second CORESET, wherein the switch timing is signaled one of: semi-statically or dynamically.

15. An apparatus configured for wireless communication, the apparatus comprising:
   at least one processor; and
   a memory coupled to the at least one processor,
   wherein the at least one processor is configured:
      to obtain, by a user equipment (UE), a set of decoding candidates;
      to receive, by the UE, a control resource set (CORESET) switch signal from the serving base station, wherein the CORESET switch signal identifies a second CORESET for the served UE to switch to in subsequent slots of the transmission opportunity after the sub-CORESET associated with the each subband;
      to receive, by the UE, a switch timing for the UE to switch to the second CORESET, wherein the switch timing is received one of: semi-statically or dynamically from the serving base station; and
      to perform, by a user equipment (UE), one or more blind decoding procedures of one or more search spaces of a sub-control resource set associated with each subband of a plurality of subbands of a transmission opportunity on a shared communication channel, wherein the one or more blind decoding procedures are performed to detect at least one of the set of decoding candidates.

16. The apparatus of claim 15 wherein the at least one processor is further configured to switch, by the UE, after the transmission opportunity back to a CORESET allocated to the transmission opportunity including a plurality of sub-CORESETs associated with the each subband of the plurality of subbands of the transmission opportunity.

* * * * *